US012148991B2

(12) United States Patent
Thyagarajan et al.

(10) Patent No.: US 12,148,991 B2
(45) Date of Patent: Nov. 19, 2024

(54) ANTENNA ASSEMBLY HAVING A HELICAL ANTENNA DISPOSED ON A FLEXIBLE SUBSTRATE WRAPPED AROUND A TUBE STRUCTURE

(71) Applicant: KYOCERA AVX Components (San Diego), Inc., San Diego, CA (US)

(72) Inventors: Mukund Ranga Thyagarajan, San Diego, CA (US); Manuel Rodriguez, San Diego, CA (US); Weichun Eric Lin, San Diego, CA (US)

(73) Assignee: Kyocera AVX Components (San Diego), Inc.

( * ) Notice: Subject to any disclaimer, the term of this patent is extended or adjusted under 35 U.S.C. 154(b) by 78 days.

(21) Appl. No.: 17/826,934

(22) Filed: May 27, 2022

(65) Prior Publication Data

US 2022/0285848 A1 Sep. 8, 2022

Related U.S. Application Data

(63) Continuation of application No. 16/898,556, filed on Jun. 11, 2020, now Pat. No. 11,349,218.

(60) Provisional application No. 62/871,886, filed on Jul. 9, 2019, provisional application No. 62/861,046, filed on Jun. 13, 2019.

(51) Int. Cl.
*H01Q 1/36* (2006.01)
*H01Q 11/08* (2006.01)

(52) U.S. Cl.
CPC .................................... *H01Q 11/08* (2013.01)

(58) Field of Classification Search
CPC ................................ H01Q 11/08; H01Q 1/36
See application file for complete search history.

(56) References Cited

U.S. PATENT DOCUMENTS

| | | | | |
|---|---|---|---|---|
| 5,191,352 | A | 3/1993 | Branson | |
| 5,581,268 | A | 12/1996 | Hirshfield | |
| 5,723,912 | A | 3/1998 | Ahrabian et al. | |
| 5,838,285 | A | 11/1998 | Tay et al. | |
| 5,986,616 | A | 11/1999 | Edvardsson | |
| 6,184,844 | B1 * | 2/2001 | Filipovic | H01Q 1/362 343/895 |
| 6,292,156 | B1 | 9/2001 | Openlander | |
| 6,384,798 | B1 | 5/2002 | Barta et al. | |
| 6,421,029 | B1 | 7/2002 | Tanabe | |
| 7,173,576 | B2 * | 2/2007 | O'Neill, Jr. | H01Q 11/08 343/702 |
| 7,253,787 | B2 | 8/2007 | Liu et al. | |
| 7,903,044 | B2 | 3/2011 | Leisten | |

(Continued)

FOREIGN PATENT DOCUMENTS

CN 101622754 1/2010

OTHER PUBLICATIONS

International Search Report and Written Opinion for Application No. PCT/US2020/037129, mailed Sep. 28, 2020, 13 pages.

(Continued)

*Primary Examiner* — Tho G Phan

(74) *Attorney, Agent, or Firm* — Dority & Manning, P.A.

(57) ABSTRACT

An antenna assembly is provided. The antenna assembly includes a tube structure disposed on a circuit board. The antenna assembly further includes a helical antenna comprising a plurality of conductive traces disposed on a flexible substrate wrapped around the tube structure.

18 Claims, 10 Drawing Sheets

(56) References Cited

U.S. PATENT DOCUMENTS

| | | | | |
|---|---|---|---|---|
| 8,547,291 | B1 * | 10/2013 | Josypenko | H01Q 11/08<br>343/895 |
| 9,214,734 | B2 | 12/2015 | Huynh | |
| 10,199,733 | B1 * | 2/2019 | DiNallo | H01Q 11/08 |
| 10,424,836 | B2 | 9/2019 | McMichael et al. | |
| 10,916,856 | B1 * | 2/2021 | Sayem | H01Q 1/362 |
| 11,349,218 | B2 * | 5/2022 | Thyagarajan | H01Q 1/02 |
| 2001/0045916 | A1 | 11/2001 | Noro et al. | |
| 2003/0016185 | A1 | 1/2003 | Morooka et al. | |
| 2003/0020670 | A1 | 1/2003 | Noro | |
| 2007/0139293 | A1 | 6/2007 | Hasegawa et al. | |
| 2010/0013735 | A1 | 1/2010 | Munger et al. | |
| 2010/0045562 | A1 | 2/2010 | Drake et al. | |
| 2010/0194665 | A1 | 8/2010 | Hanane et al. | |
| 2017/0062917 | A1 | 3/2017 | Hyjazie et al. | |
| 2018/0090829 | A1 | 3/2018 | McMichael et al. | |

OTHER PUBLICATIONS

Hyun-Sung Tae, et al., "Printed Square Quadirifilar Helix Antenna (QHA) for XM Satellite Radio Receiver", The 40th European Microwave Conference, published in 2010, pp. 1469-1471 (3 pages).

Extended European Search Report Corresponding to EP Application 20823334.6, mailed Dec. 13, 2022, 9 pages.

* cited by examiner

ANTENNA ASSEMBLY HAVING A HELICAL ANTENNA DISPOSED ON A FLEXIBLE SUBSTRATE WRAPPED AROUND A TUBE STRUCTURE

PRIORITY CLAIM

The present application claims the benefit of priority to U.S. patent application Ser. No. 16/898,556, titled "Antenna Assembly Having a Helical Antenna Disposed on a Flexible Substrate Wrapped Around a Tube Structure," having a filing date of Jun. 11, 2020, which is based on and claims priority to U.S. Provisional App. No. 62/861,046, titled "Antenna Assembly Having a Helical Antenna Disposed on a Flexible Substrate Wrapped Around a Tube Structure," having a filing date of Jun. 13, 2019, which is incorporated by reference herein. The present application also claims the benefit of priority of U.S. Provisional App. No. 62/871,886, titled "Antenna Assembly Having a Helical Antenna Disposed on a Flexible Substrate Wrapped Around a Tube Structure," having a filing date of Jul. 9, 2019, which is incorporated by reference herein.

FIELD

The present disclosure relates generally to an antenna assembly.

BACKGROUND

Helical antennas can be used to facilitate communication between two devices. For example, helical antennas can be used to facilitate communication with a satellite. Helical antennas can convert electrical signals into radio frequency (RF) waves that can be transmitted over the air to another device. Helical antennas can also convert RF waves into electrical signals. In some instances, patch antennas must be designed to operate over a broad range of frequencies, which can impact the axial ratio of a radiation pattern associated with helical antennas.

SUMMARY

Aspects and advantages of embodiments of the present disclosure will be set forth in part in the following description, or may be learned from the description, or may be learned through practice of the embodiments.

In one aspect, an antenna assembly is provided. The antenna assembly includes a tube structure disposed on a circuit board. The antenna assembly further includes a helical antenna comprising a plurality of conductive traces disposed on a flexible substrate wrapped around the tube structure.

In another aspect, an antenna assembly is provided. The antenna assembly includes a tube structure coupled to a first side of a circuit board. The antenna assembly further includes a helical antenna disposed on a flexible substrate wrapped around the tube structure. Furthermore, the antenna assembly includes a phase shifter circuit coupled to a second side of the circuit board. The phase shifter circuit configured to provide a RF signal to the helical antenna such that an axial ratio of a radiation pattern associated with the helical antenna is less than 4 decibels when an elevation angle of the helical antenna is from about −25 degrees to about −40 degrees or from about 25 degrees to 40 degrees.

In yet another aspect, a method of manufacturing an antenna assembly having a helical antenna disposed on a flexible substrate is provided. The method includes aligning a first alignment point of a plurality of alignment points of the helical antenna with a first alignment point on a circuit board of the antenna assembly. Furthermore, subsequent to aligning the first alignment point of the helical antenna with the first alignment point of the circuit board, the method includes wrapping the flexible substrate around a tube structure disposed on the circuit board.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
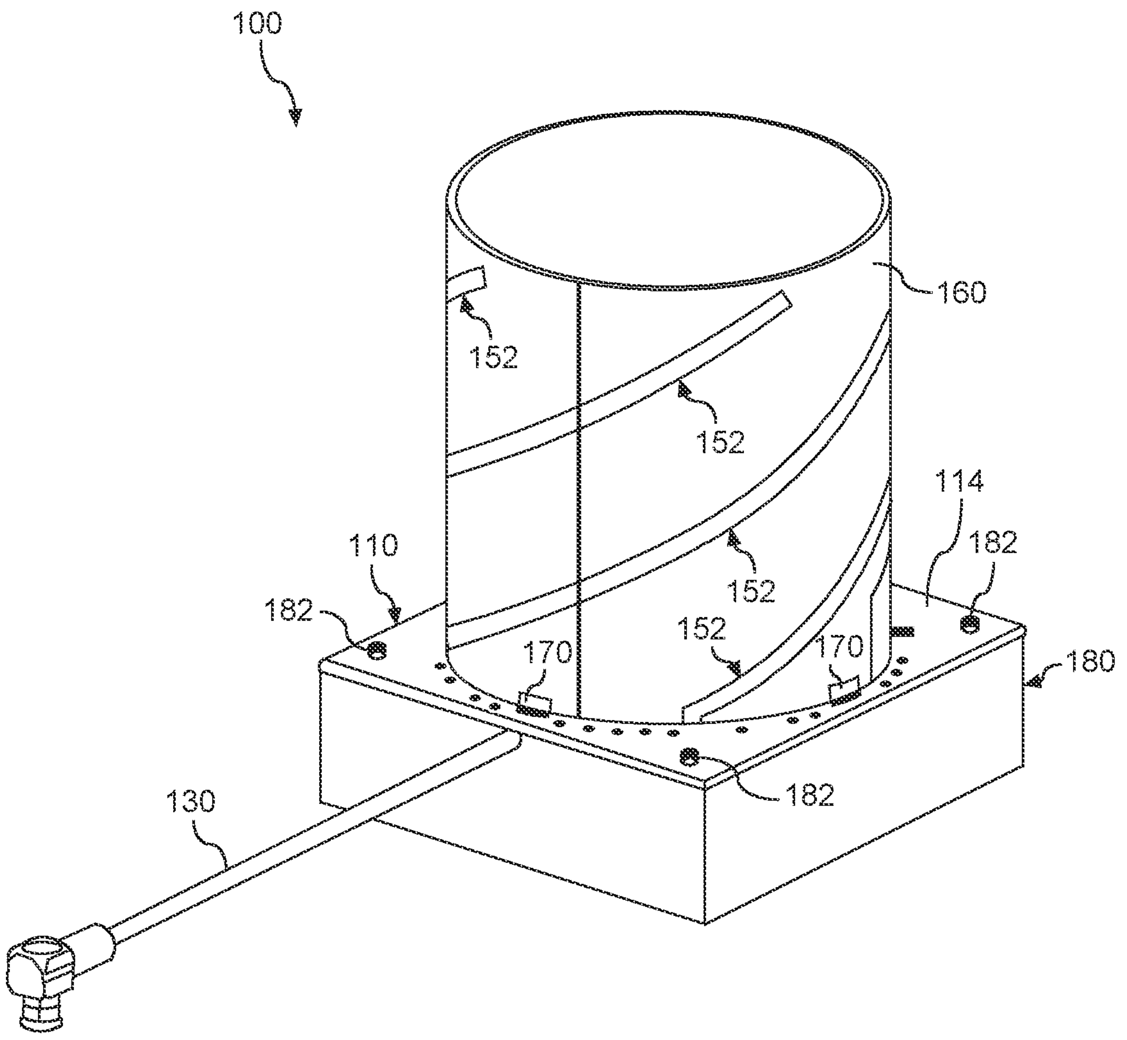
FIG. 1 depicts a perspective view of an antenna assembly according to example embodiments of the present disclosure.
Figure 2:
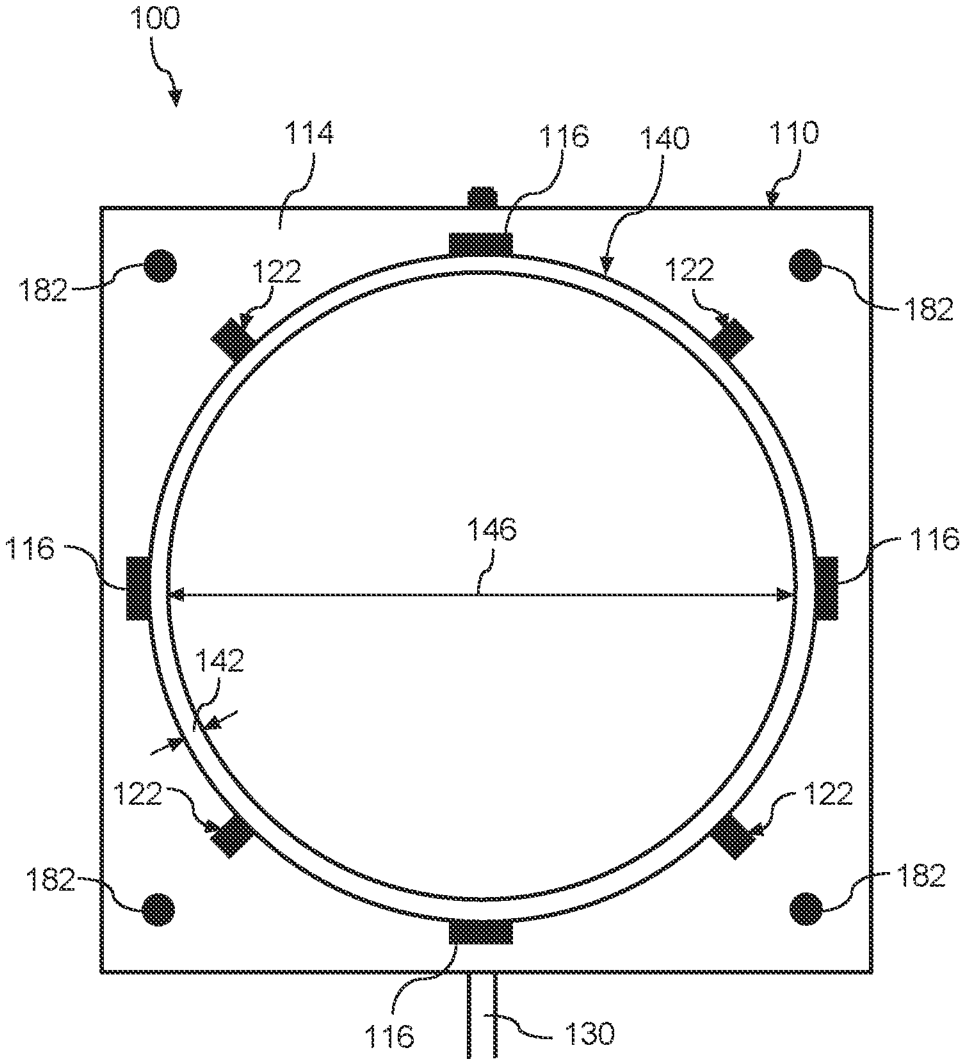
FIG. 2 depicts a top view of an antenna assembly according to example embodiments of the present disclosure.
Figure 3:
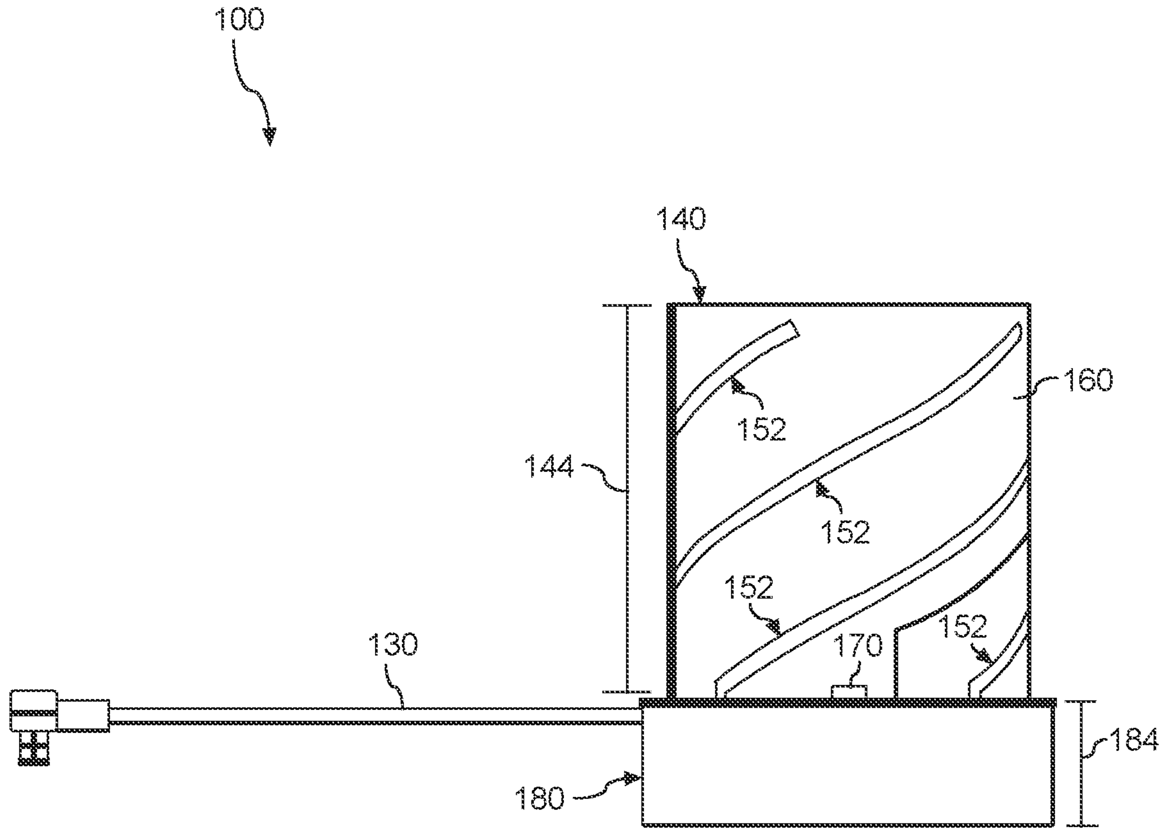
FIG. 3 depicts a side view of an antenna assembly according to example embodiments of the present disclosure.
Figure 4:
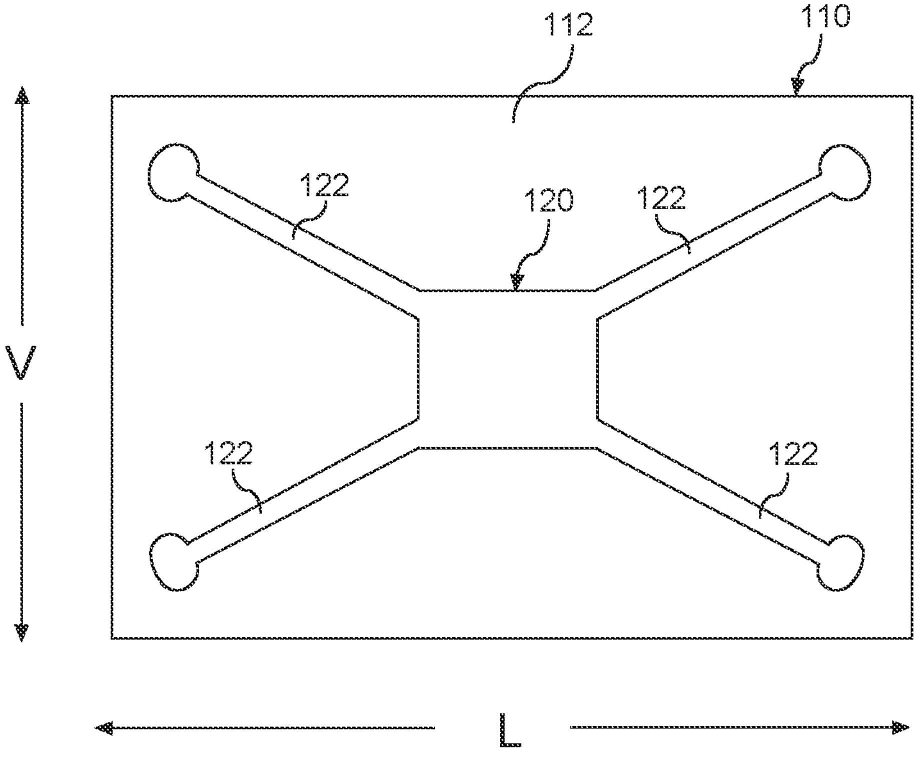
FIG. 4 depicts a phase shifter circuit disposed on a circuit board of an antenna assembly according to example embodiments of the present disclosure.
Figure 5:
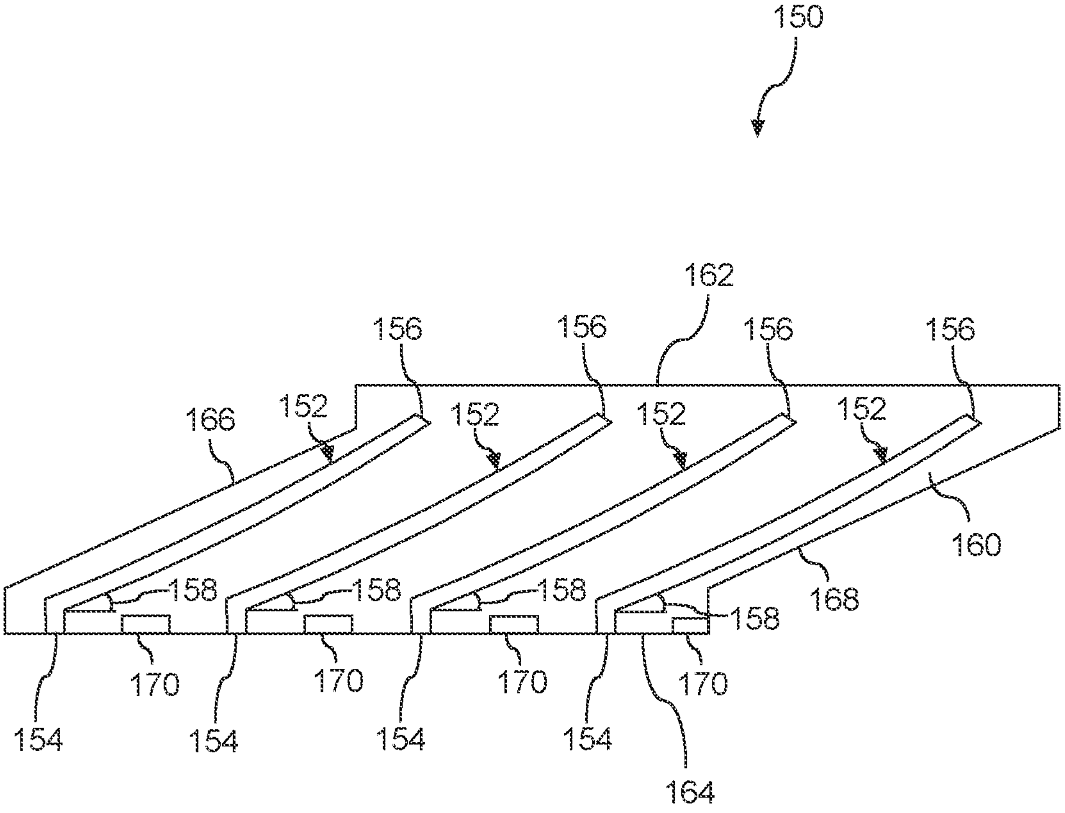
FIG. 5 depicts a helical antenna of an antenna assembly disposed on a flexible substrate according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an antenna assembly. The antenna assembly can include a circuit board having a first side and a second side. The antenna assembly can further include a tube structure disposed on the second side of the circuit board. In some implementations, the tube structure can be formed from a polycarbonate material. The tube structure can have any suitable size and shape. For instance, the tube structure can, in some implementations, be a cylinder.

The antenna assembly can further include a helical antenna. The helical antenna can be a circularly polarized helical antenna. For instance, the helical antenna can be a left hand circular polarized (LHCP) antenna or a right hand circular polarized (RHCP) antenna. In some implementations, the helical antenna can be configured to transmit and receive RF signals over a range of frequencies associated with satellite communications (e.g., S-band, L-band, GPS, Iridium, etc.). For example, the range of frequencies can be from about 1980 megahertz (MHz) to about 2200 MHz. As another example, the range of frequencies can be from about 1000 MHz to about 1800 MHz.

In some implementations, the helical antenna can include a plurality of conductive traces. Each of the plurality of conductive traces can include a first portion and a second portion. The second portion can extend from the first portion such that an angle is defined between the first portion and the second portion. In some implementations, the angle can be between about 25 degrees and about 40 degrees. It should be appreciated that the plurality of conductive traces can be formed from any suitable type of conductive material. For instance, in some implementations, the plurality of traces can be formed from copper.

In some implementations, the plurality of conductive traces can be disposed on a flexible substrate such that the plurality of conductive traces are equally spaced apart from one another. Alternatively or additionally, the flexible substrate can have a non-rectangular shape to facilitate wrapping the flexible substrate around the tube structure. It should be appreciated that the flexible substrate can be any suitable type of flexible material. For instance, in some implementations, the flexible substrate can be a polyimide film (e.g., Kapton material).

In some implementations, the helical antenna can include a plurality of alignment points or features disposed on the flexible substrate and equally spaced apart from one another. The plurality of alignment points can facilitate alignment of the helical antenna relative to the circuit board prior to wrapping the flexible substrate around the tube structure. For instance, the helical antenna can be positioned relative to the circuit board such that a first alignment point of the plurality of alignment points disposed on the flexible substrate is aligned with a corresponding alignment point of a plurality of alignment points disposed on the second side of the circuit board and circumferentially spaced around the tube structure. In this manner, the alignment points on the helical antenna and the circuit board, respectively, can facilitate alignment of the helical antenna relative to the circuit board prior to wrapping the flexible substrate around the tube structure.

When the first alignment point of the plurality of alignment points disposed on the flexible substrate is aligned with a first alignment point of the plurality of alignment points disposed on the circuit board and circumferentially spaced around the tube structure, the flexible substrate can be wrapped around the tube structure such that each of the plurality of conductive traces of the helical antenna is aligned with a corresponding conductive trace of a plurality of conductive traces associated with a phase shifter circuit disposed on the circuit board. In some implementations, a first conductive trace of the plurality of conductive traces disposed on the flexible substrate can be secured or connected to a first conductive trace of the phase shifter circuit prior to wrapping the flexible substrate around the tube structure to align the remaining conductive traces of the helical antenna with a corresponding conductive trace associated with the phase shifter circuit. For instance, the first conductive trace of the plurality of conductive traces disposed on the flexible substrate can be soldered to the first conductive trace of the plurality of conductive traces associated with the phase shifter circuit.

In some implementations, the flexible substrate can be wrapped around the tube structure once the first conductive trace of the plurality of conductive traces disposed on the flexible substrate is secured to the first conductive trace of the plurality of conductive traces associated with the phase shifter circuit. As the flexible substrate is wrapped around the tube structure, the remaining alignment points of the plurality of alignment points disposed on the flexible substrate can become aligned with a corresponding alignment point of the plurality of alignment points disposed on the circuit board. Furthermore, the remaining conductive traces of the plurality of conductive traces disposed on the flexible substrate can become aligned with a corresponding conductive trace of the plurality of conductive traces associated with the phase shifter circuit. In this manner, each of the remaining conductive traces of the plurality of conductive traces disposed on the flexible substrate can be secured or connected to the corresponding conductive trace of the plurality of conductive traces associated with the phase shifter circuit. For instance, each of the remaining conductive traces disposed on the flexible substrate can be soldered to a corresponding conductive trace associated with the phase shifter circuit.

When each of the plurality of conductive traces disposed on the flexible substrate is secured or connected to a corresponding conductive trace of the plurality of conductive traces associated with the phase shifter circuit, the phase shifter circuit can provide a RF signal to each of the plurality of conductive traces disposed on the flexible substrate.

In some implementations, the phase shifter circuit can be configured to provide a first RF signal to a first conductive trace of the plurality of conductive traces disposed on the flexible substrate. The phase shifter circuit can be further configured to provide a second RF signal to a second conductive trace of the plurality of conductive traces disposed on the flexible substrate. In some implementations, the second RF signal can be about 90 degrees out-of-phase relative to the first RF signal. The phase shifter circuit can be further configured to provide a third RF signal to a third conductive trace of the plurality of conductive traces. In some implementations the third RF signal about 180 degrees out-of-phase relative to the first RF signal. The phase shifter circuit can be configured to provide a fourth RF signal to a fourth conductive trace of the plurality of conductive traces disposed on the flexible substrate. In some implementations, the fourth RF signal can be about 270 degrees out-of-of phase relative to the first RF signal.

In some implementations, the antenna assembly can include a spacer coupleable to the circuit board. The spacer can include a plurality of projections. When the spacer is coupled to the circuit board, each of the plurality of projections extends through a corresponding aperture of a plurality of apertures defined by the circuit board. In this manner, heat generated by one or more electrical components (e.g., phase shifter circuit) on the circuit board can be dissipated via the spacer. Furthermore, the spacer can be positioned between the circuit board and a ground plane (not shown) when the spacer is coupled to the circuit board. In this manner, the helical antenna disposed on the flexible substrate wrapped around the tube structure can be spaced apart from the ground plane when the spacer is coupled to the circuit board.

When the antenna element is placed on the ground plane without a spacer positioned therebetween, parameters (e.g., axial ratio, low elevation gain, etc.) associated with the radiation pattern can be affected due, at least in part, to the ground plane. In particular, the ground plane can cause the radiation pattern to be more directional. Thus, the spacer of the antenna assembly can allow the helical antenna to be spaced apart from the ground place such that the radiation pattern of the helical antenna is similar to the radiation pattern of the helical antenna if the helical antenna were a standalone unit.

The axial ratio of conventional patch antennas over a range of elevation angles associated with satellite communications can be between 5 decibels and 6 decibels. In particular, the range of elevation angles can span from about 25 degrees from horizon to about 35 degrees from horizon. It should be understood that that an axial ratio between 5 decibels and 6 decibels over the range of elevation angles associated with satellite communications can degrade the circular polarization of the patch antenna.

The antenna assembly of the present disclosure can provide numerous technical benefits. For instance, the axial ratio of the helical antenna according the present disclosure can be about 3 decibels over the range of elevation angles associated with the satellite communications. In this manner, the axial ration of the helical antenna according the present disclosure can exhibit an improvement of about 2 decibels over the range of elevation angles associated with satellite communications as compared to the axial ratio of conventional patch antennas over the range of elevation angles associated with satellite communications. As such, the circular polarization of the helical antenna can be improved compared to the circular polarization of conventional patch antenna over the range of elevation angles associated with satellite communications.

As used herein, use of the term "axial ratio" refers to a ratio between minor and major axes of a radiation pattern provided by the helical antenna of the antenna assembly according to example embodiments of the present disclosure. As used herein, use of the term "about" or "nearly" in conjunction with a numerical value is intended to refer to within ten percent (10%) of the stated numerical value.

Referring now to the FIGS., FIGS. 1 through 5 depicts an antenna assembly 100 according to example embodiments of the present disclosure. As shown, the antenna assembly 100 can include a circuit board 110. In some implementations, the antenna assembly 100 can include a phase shifter circuit 120 disposed on the circuit board 110. More specifically, the phase shifter circuit 120 can be disposed on a first side 112 of the circuit board 110. In some implementations, the phase shifter circuit 120 can be coupled to a radio frequency (RF) source (not shown) via a conductor 130. In this manner, a RF signal generated by the RF source can be provided to the phase shifter circuit 120 via the conductor 130. As shown, the phase shifter circuit 120 can include a plurality of conductive traces 122. In some implementations, the plurality of conductive traces 122 can be rotated relative to one another. For instance, in some implementations, the plurality of conductive traces 122 can be rotated about 90 degrees relative to one another.

In some implementations, the antenna assembly 100 can include a tube structure 140 disposed on the circuit board 110. More specifically, the tube structure 140 can be disposed on a second side 114 of the circuit board 110 that is opposite the first side 112. In some implementations, the tube structure 140 can be a cylinder having any suitable dimensions. For instance, the tube structure 140 can have a thickness 142 of about 1 millimeter. Alternatively or additionally, a height 144 of the tube structure 140 can range from about 50 millimeters to about 80 millimeters. Furthermore, a diameter 146 of the tube structure 140 can range from about 30 millimeters to about 50 millimeters. In some implementations, the diameter 146 can correspond to the inner diameter of the tube structure 140. Alternatively, the diameter 146 can correspond to the outer diameter of the tube structure 140.

It should be appreciated that the tube structure 140 can have any suitable shape. It should also be appreciated that the tube structure 140 can be formed from any suitable type of material. For instance, in some implementations, the tube structure 140 can be formed from a polycarbonate material.

In some implementations, the antenna assembly 100 can include a helical antenna 150. The helical antenna 150 can be a circularly polarized helical antenna 150. For instance, the helical antenna 150 can be a left hand circular polarized (LHCP) antenna or a right hand circular polarized (RHCP) antenna. In some implementations, the helical antenna 150 can be configured to transmit and receive RF signals over a range of frequencies associated with satellite communications (e.g., S-band, L-band, GPS, Iridium, etc.). For example, the range of frequencies can be from about 1980 megahertz (MHz) to about 2200 MHz. As another example, the range of frequencies can be from about 1000 MHz to about 1800 MHz.

As shown, the helical antenna 150 can define a coordinate system that includes a lateral direction L and a vertical direction V. In some implementations, the helical antenna 150 can include a plurality of conductive traces 152. As shown, each of the plurality of conductive traces 152 can include a first portion 154 and a second portion 156. The second portion 156 can extend from the first portion 154 such that an angle 158 is defined between the first portion 154 and the second portion 156. It should be understood that the angle 158 can correspond to an angle defined between the circuit board 110 and each of the plurality of conductive traces 152. In some implementations, the angle 158 can be between about 25 degrees and about 40 degrees. It should be appreciated that the plurality of conductive traces 152 can be formed from any suitable type of conductive material. For instance, in some implementations, the plurality of conductive traces 152 can be formed from copper.

In some implementations, the plurality of conductive traces 152 can be disposed on a flexible substrate 160 such that the plurality of conductive traces 152 are equally spaced from one another. More specifically, the plurality of conductive traces 152 can be equally spaced from one another along the lateral direction L. Furthermore, in some implementations, the flexible substrate 160 can have a non-rectangular shape to facilitate wrapping the flexible substrate 160 around the tube structure 140. As shown, the flexible substrate 160 can extend along the vertical direction V between a top portion 162 of the flexible substrate 160 and a bottom portion 164 of the flexible substrate 160. The flexible substrate 160 can further extend along the lateral direction L between a first side 166 of the flexible substrate 160 and a second side 168 of the flexible substrate 160. It should be appreciated that the flexible substrate 160 can be any suitable type of flexible material. For instance, in some implementations, the flexible substrate 160 can be a polyimide film (e.g., Kapton material).

In some implementations, the helical antenna 150 can include a plurality of alignment points 170 disposed on the flexible substrate 160 and equally spaced from one another along the lateral direction L. The plurality of alignment points 170 can be used to facilitate alignment of the helical antenna 150 relative to the circuit board 110. For instance, the helical antenna 150 can be positioned relative to the circuit board 110 such that a first alignment point of the plurality of alignment points 170 disposed on the flexible substrate 160 is aligned with a corresponding alignment point of a plurality of alignment points 116 disposed on the second side 114 of the circuit board 110 and circumferentially spaced from one another around the circumference of the tube structure 140. In this manner, the plurality of alignment points 170 disposed on the flexible substrate 160 and the plurality of alignment points 116 disposed on the circuit board 110 can facilitate alignment of the helical antenna 150 relative to the circuit board 110 prior to wrapping the flexible substrate 160 around the tube structure 140.

When the first alignment point of the plurality of alignment points 170 disposed on the flexible substrate 160 is aligned with the first alignment point of the plurality of alignment points 116 disposed on the circuit board 110, the flexible substrate 160 can be wrapped around the tube structure 140 such that each of the plurality of conductive traces 152 disposed on the flexible substrate 160 is aligned with a corresponding conductive trace of the plurality of conductive traces 122 associated with the phase shifter circuit 120. In some implementations, a first conductive trace of the plurality of conductive traces 152 disposed on the flexible substrate 160 can be secured or connected to a first conductive trace of the plurality of conductive traces 122 associated with the phase shifter circuit 120 prior to wrapping the flexible substrate 160 around the tube structure 140 to align the remaining conductive traces 152 of the helical antenna 150 with a corresponding conductive of the plurality of conductive traces 122 associated with the phase shifter circuit 120. For instance, the first conductive trace of the plurality of conductive traces 152 disposed on the flexible substrate 160 can be soldered to the first conductive trace of the plurality of conductive traces 122 associated with the phase shifter circuit 120.

In some implementations, the flexible substrate 160 can be wrapped around the tube structure 140 such that the flexible substrate 160 surrounds the circumference of the tube structure 140 once the first conductive trace of the plurality of conductive traces 152 disposed on the flexible substrate is secured to the first conductive trace of the plurality of conductive traces 122 associated with the phase shifter circuit 120. As the flexible substrate 160 is wrapped around the tube structure 140, it should be understood that the remaining alignment points of the plurality of alignment points 170 disposed on the flexible substrate 160 can become aligned with a corresponding alignment point of the plurality of alignment points 116 disposed on the circuit board 110 and circumferentially spaced around the perimeter of the tube structure 140. Furthermore, the remaining traces of the plurality of conductive traces 152 disposed on the flexible substrate 160 can become aligned with a corresponding conductive trace of the plurality of conductive traces associated with the phase shifter circuit 120. In this manner, each of the remaining conductive traces of the plurality of conductive traces 152 disposed on the flexible substrate can be secured or connected to the corresponding conductive trace of the plurality of conductive traces 122 associated with the phase shifter circuit 120.

When each of the plurality of conductive traces 152 disposed on the flexible substrate 160 is secured to a corresponding conductive trace of the plurality of conductive traces 122 associated with the phase shifter circuit 120, the phase shifter circuit 120 can provide a RF signal to each of the plurality of conductive traces 152 disposed on the flexible substrate 160.

For instance, the phase shifter circuit 120 can be configured to provide a first RF signal to a first conductive trace of the plurality of conductive traces 152 disposed on the flexible substrate 160. The phase shifter circuit 120 can be configured to provide a second RF signal to a second conductive trace of the plurality of conductive traces 152 disposed on the flexible substrate 160. In some implementations, the second RF signal can be about 90 degrees out-of-phase relative to the first RF signal. The phase shifter circuit 120 can be further configured to provide a third RF signal to a third conductive trace of the plurality of conductive traces 152. In some implementations the third RF signal about 180 degrees out-of-phase relative to the first RF signal. The phase shifter circuit 120 can be configured to provide a fourth RF signal to a fourth conductive trace of the plurality of conductive traces 152 disposed on the flexible substrate 160. In some implementations, the fourth RF signal can be about 270 degrees out-of-of phase relative to the first RF signal.

In some implementations, the antenna assembly 100 can include a spacer 180 coupleable to the circuit board 110. In some implementations, the spacer 180 can include a plurality of projections 182. When the spacer is coupled to the circuit board 110, each of the plurality of projections 182 extends through a corresponding aperture of a plurality of apertures (not shown) defined by the circuit board 110. In this manner, heat generated by one or more electrical components (e.g., phase shifter circuit 120) on the circuit board 110 can be dissipated via the spacer 180.

When the spacer 180 is coupled to the circuit board 110, the spacer 180 can be positioned between the circuit board 110 and a ground plane (not shown). In this manner, the helical antenna 150 disposed on the flexible substrate 160 wrapped around the tube structure 140 is spaced apart from the ground plane. In some implementations, a height 184 of the spacer 180 can range from about 5 millimeters to about 25 millimeters.

Figure 6:
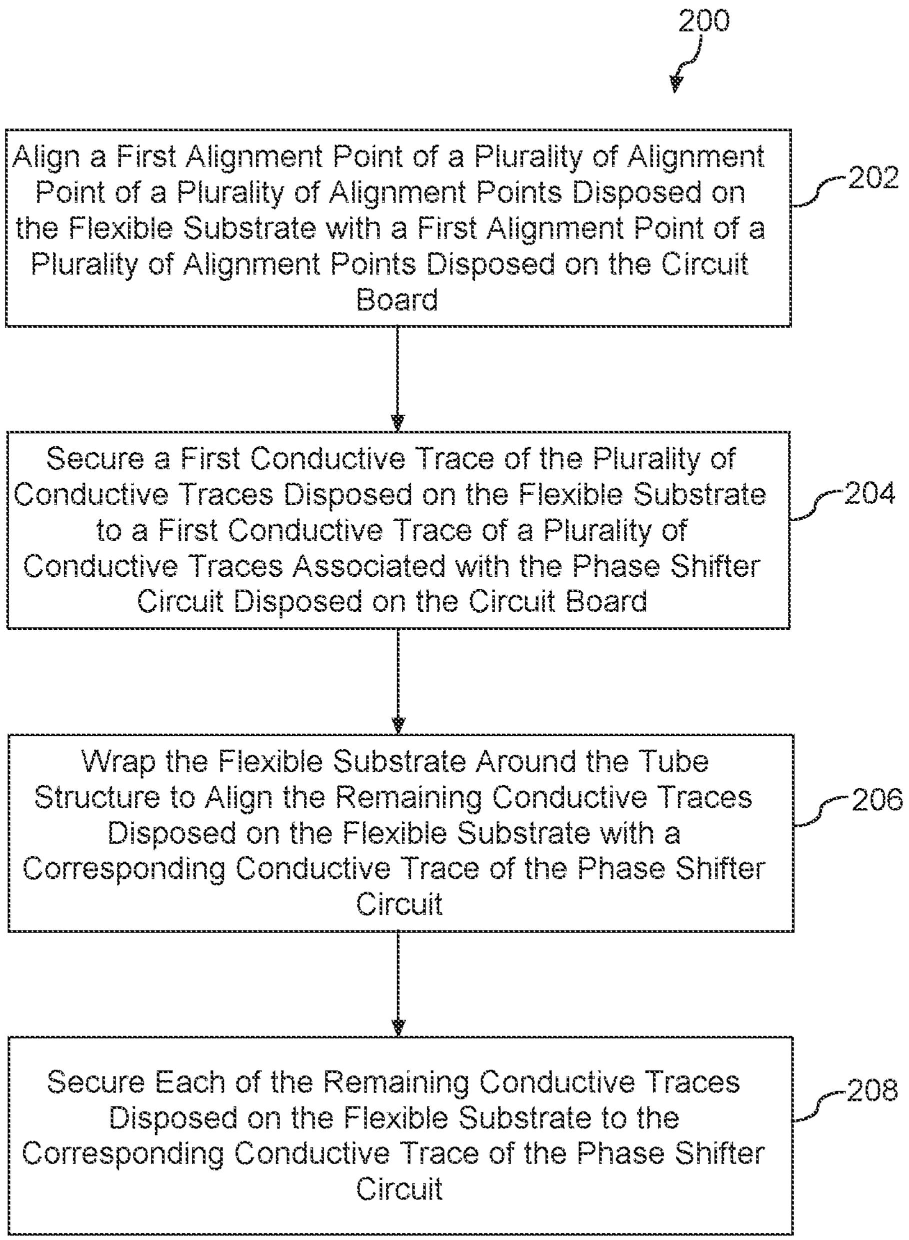
FIG. 6 depicts a flow diagram of a method for manufacturing an antenna assembly according to example embodiments of the present disclosure.

Referring now to FIG. 6, a flow diagram of a method 200 for manufacturing an antenna assembly is provided according to example embodiments of the present disclosure. In general, the method 200 will be discussed herein with reference to the antenna assembly described above with reference to FIGS. 1 through 5. However, although FIG. 6 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (202), the method 200 can include aligning the helical antenna disposed on the flexible substrate with the circuit board. In example embodiments, the helical antenna can be aligned relative to the circuit board such that a first alignment point or feature of the helical antenna is aligned with a first alignment point or feature of the circuit board. When the helical antenna is aligned relative to the circuit board, the method 200 proceeds to (204).

At (204), the method 200 can include securing or connecting a first conductive trace of the plurality of conductive traces disposed on the flexible substrate to a first conductive trace of a plurality of conductive traces associated with a phase shifter circuit disposed on the circuit board. In some implementations, the first conductive trace disposed on the flexible substrate can be soldered to the first conductive trace of the phase shifter circuit. When the first conductive trace disposed on the flexible substrate is secured to the first conductive trace of the phase shifter circuit, the method 200 can proceed to (206).

At (206), the method 200 can include wrapping the flexible substrate around the tube structure. As the flexible substrate is wrapped around the tube structure, the remaining alignment points of the plurality of alignment points disposed on the flexible substrate become aligned with a corresponding alignment point of the plurality of alignment points disposed on the circuit board. Furthermore, the remaining conductive traces of the plurality of conductive traces disposed on the flexible substrate become aligned with a corresponding conductive trace of the plurality of conductive traces associated with the phase shifter circuit. When the remaining conductive traces disposed on the flexible substrate are aligned with a corresponding conductive trace associated with the phase shifter circuit, the method 200 can proceed to (208).

Figure 7:
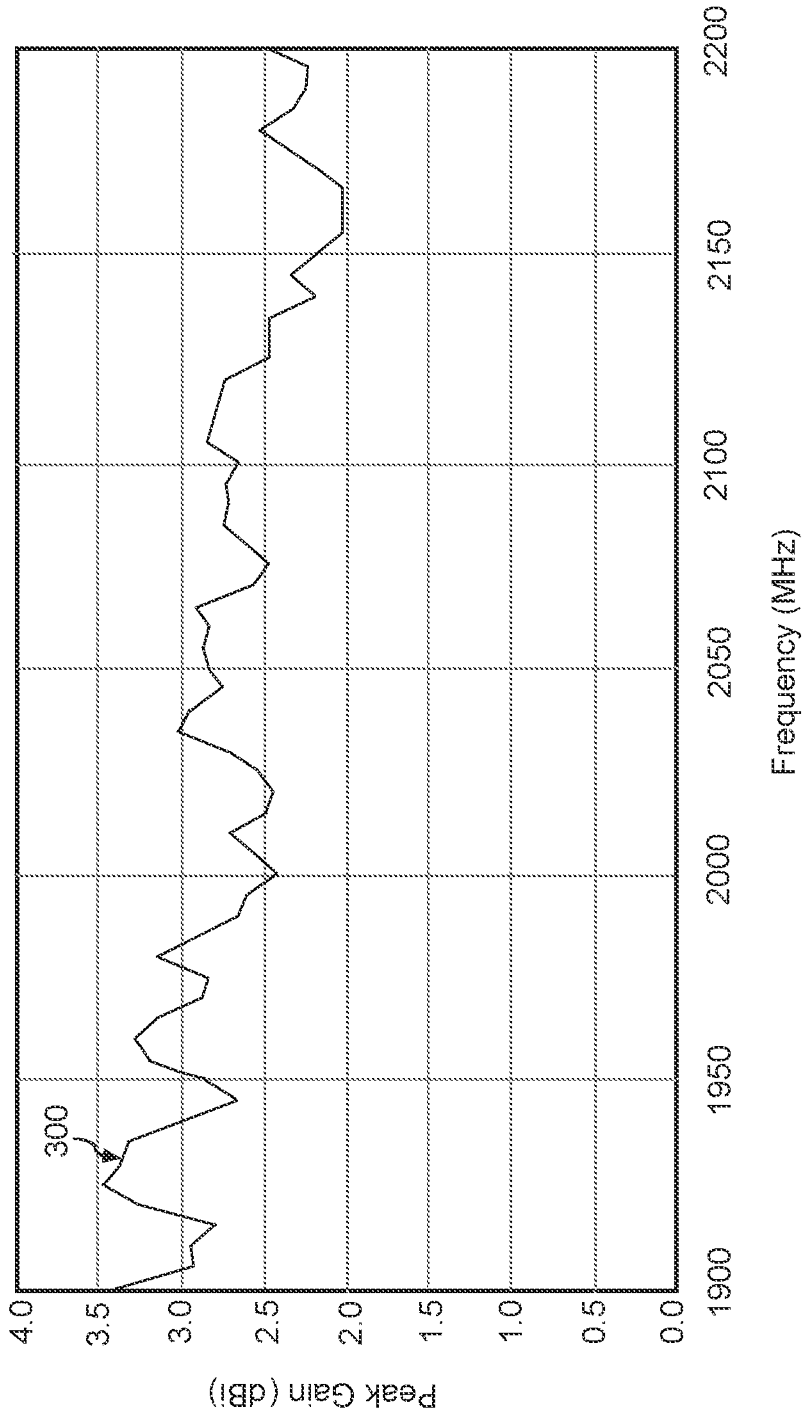
FIG. 7 depicts a graphical representation of a peak gain of a helical antenna of an antenna assembly according to example embodiments of the present disclosure.

At (208), the method 200 can include securing or connecting each of the remaining conductive traces disposed on the flexible substrate to a corresponding conductive trace associated with the phase shifter circuit. For instance, a second conductive trace of the plurality of conductive traces disposed on the flexible substrate can be secured (e.g. soldered) to a second conductive trace of the plurality of conductive traces associated with the phase shifter circuit. Likewise, a third conductive trace of the plurality of conductive traces disposed on the flexible substrate can be secured (e.g. soldered) to a third conductive trace of the plurality of conductive traces associated with the phase shifter circuit. Furthermore, a fourth conductive trace of the plurality of conductive traces disposed on the flexible substrate can be secured (e.g. soldered) to a fourth conductive trace of the plurality of conductive traces associated with the phase shifter circuit Referring now to FIG. 7, a graphical representation of a peak gain of the helical antenna 150 of the antenna assembly 100 is provided according to example embodiments of the present disclosure. As shown, the graph in FIG. 7 illustrates the peak gain of the helical antenna 150 as a function of frequency (denoted along the horizontal axis in Megahertz). As may be seen, curve 300 illustrates the gain pattern or radiation pattern of the helical antenna 150 of the antenna assembly 100 over a range of frequencies spanning from 1900 MHz to 2200 MHz. Although FIG. 7 is limited to the S-band (e.g., 1900 MHz to 2200 MHz), it should be appreciated that the helical antenna 150 can be configured to operate over any suitable frequency band associated with satellite communications. For instance, in some implementations, the helical antenna 150 can be configured to operate within the L-band. Alternatively, the helical antenna 150 can be configured to operate with the Iridium band.

Figure 8:
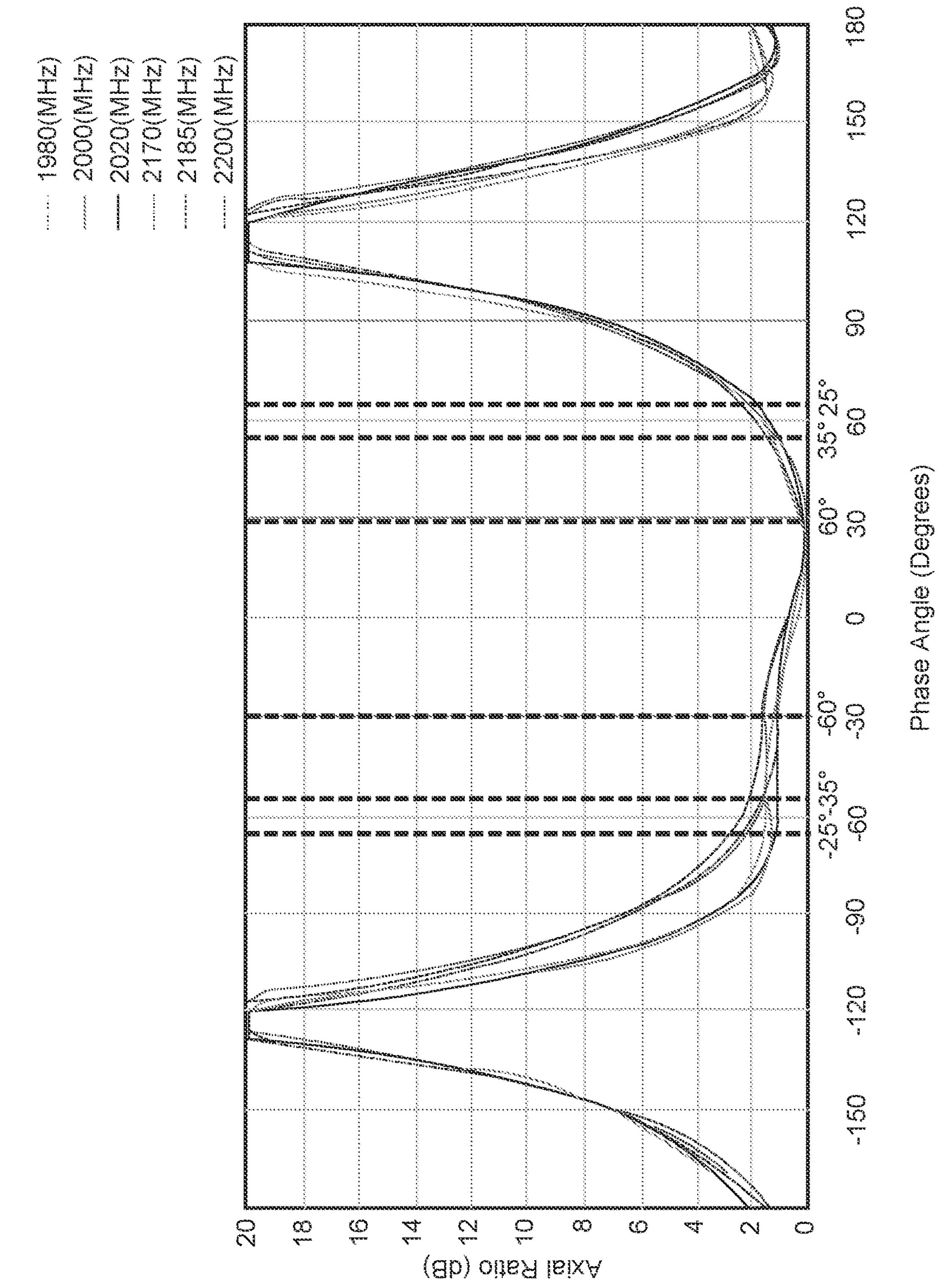
FIG. 8 depicts a graphical representation of an axial ratio associated with a radiation pattern of a helical antenna of an antenna assembly according to example embodiments of the present disclosure.

Referring now to FIG. 8, a graphical representation of an axial ratio associated with a radiation pattern of the helical antenna 150 (FIG. 1) of the antenna assembly 100 (FIG. 1) is provided according to example embodiments of the present disclosure. As shown, the graph in FIG. 8 illustrates the axial ratio as a function of an elevation angle (denoted along the horizontal axis in degrees) of the helical antenna 150. As may be seen, the axial ratio of the radiation pattern associated with the helical antenna 150 is less than about 4 decibels when the elevation angle of the helical antenna 150 ranges from about 25 degrees below horizon to about 35 degrees below horizon. More specifically, the axial ratio is about 3 decibels. Likewise, the axial ratio of the radiation pattern associated with the helical antenna 150 is less than about 4 decibels when the elevation angle of the helical antenna 150 ranges from about 25 degrees above horizon to about 35 degrees above horizon. More specifically, the axial ratio is about 3 decibels.

Figure 9:
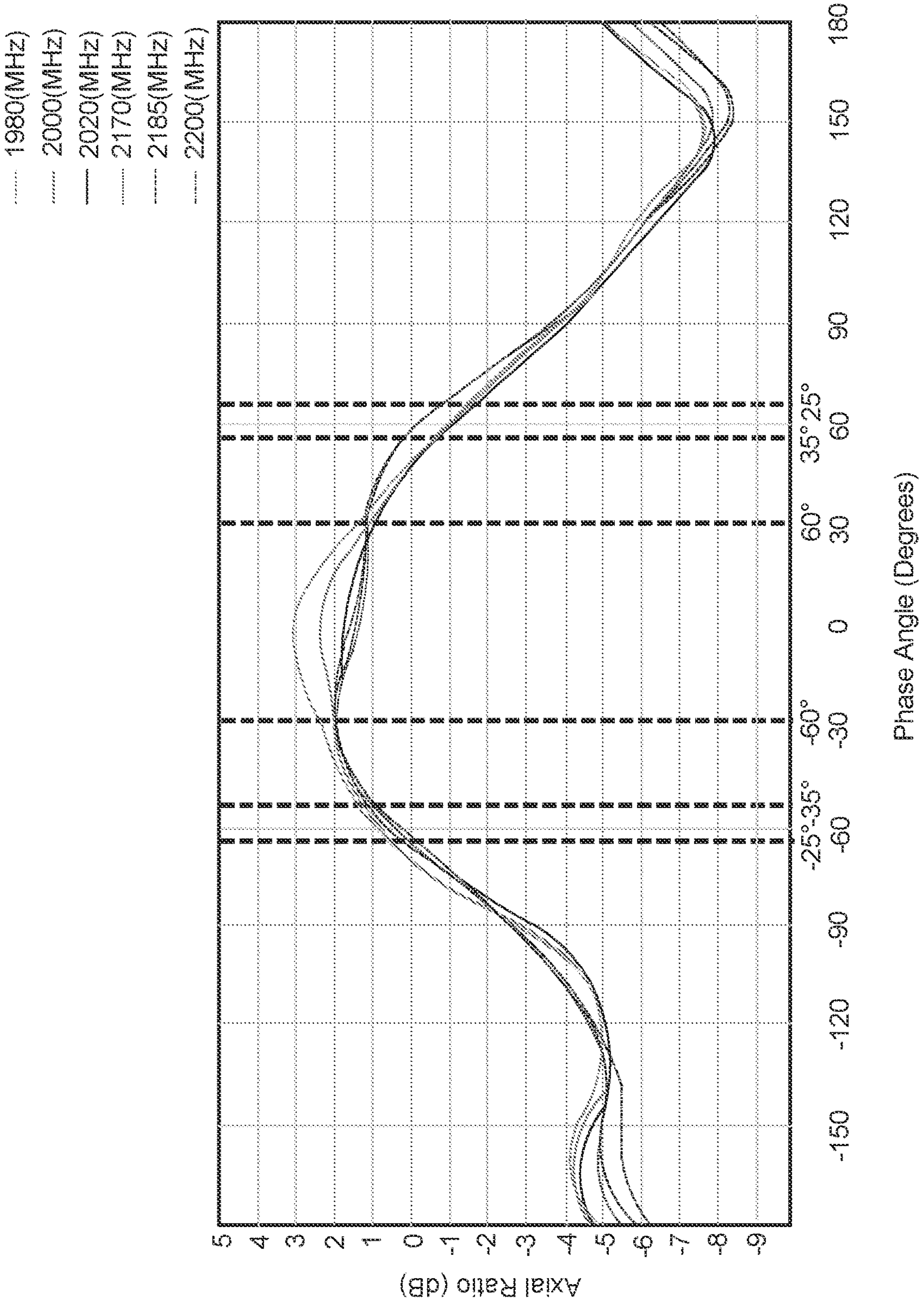
FIG. 9 depicts a graphical representation of a total gain of a helical antenna of an antenna assembly according to example embodiments of the present disclosure.

Referring now to FIG. 9, a graphical representation of a total gain of the helical antenna 150 (FIG. 1) of the antenna assembly 100 (FIG. 1) is provided according to example embodiments of the present disclosure. As shown, the graph in FIG. 9 illustrates the total gain as a function of an elevation angle (denoted along the horizontal axis in degrees) of the helical antenna 150. As may be seen, the gain of the radiation pattern associated with the helical antenna 150 is about 1 dBi when the elevation angle of the helical antenna 150 ranges from about 25 degrees below horizon to about 35 degrees below horizon. Conversely, the gain of the radiation pattern associated with the helical antenna 150 is about −1 dBi when the elevation angle of the helical antenna 150 ranges from about 25 degrees above horizon to about 35 degrees above horizon.

Figure 10:
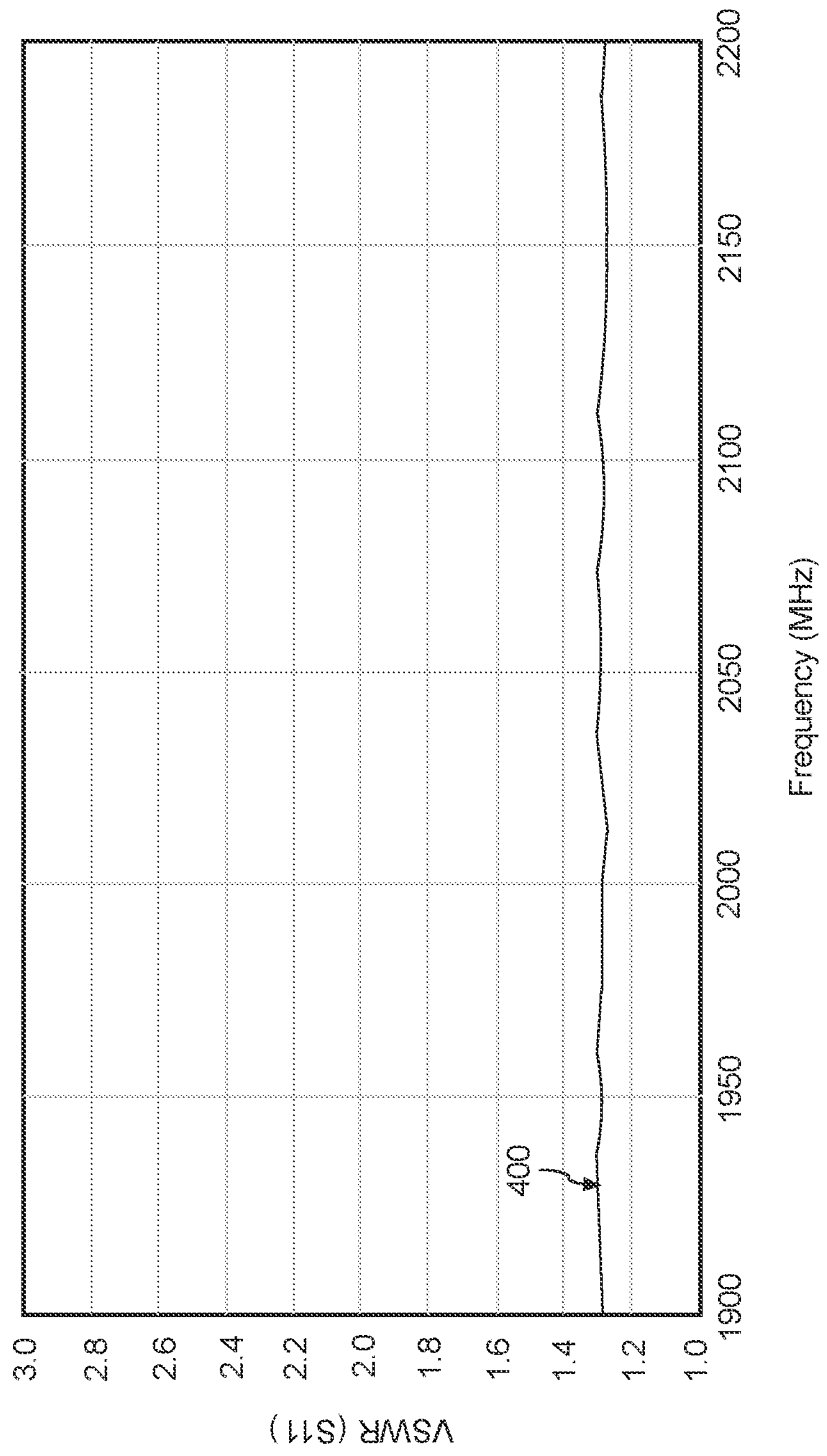
FIG. 10 depicts a graphical representation of a voltage standing wave ratio (VSWR) associated with a helical antenna of an antenna assembly according to example embodiments of the present disclosure.

Referring now to FIG. 10, a graphical representation of a VSWR associated with the helical antenna 150 (FIG. 1) of the antenna assembly 100 (FIG. 1) is provided according to example embodiments of the present disclosure. As shown, the graph in FIG. 8 illustrates the VSWR as a function of frequency (denoted along the horizontal axis in Megahertz). As may be seen, curve 400 illustrates the VSWR is less than 1.5 across a frequency band that spans from 1900 MHz to 2200 MHz. It should be appreciated that the frequency band can be associated with satellite communications.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna assembly comprising:

a circuit board;

a structure disposed on a first surface of the circuit board;

a flexible substrate wrapped around the structure; and a helical antenna including a plurality of conductive traces and a first plurality of alignment points disposed on the flexible substrate, one or more of the conductive traces including a first portion and a second portion that extends from the first portion at an acute angle defined from the circuit board, each of the first plurality of alignment points positioned between the first portion of the one or more of the conductive traces.

2. The antenna assembly of claim 1, further comprising:

a spacer positioned between the circuit board and a ground plane, the spacer including a projection extending through an aperture defined by the circuit board.

3. The antenna assembly of claim 1, further comprising:

a phase shifter circuit disposed on a second surface of the circuit board, the phase shifter circuit configured to:

provide a first RF signal to a first conductive trace of the plurality of conductive traces;

provide a second RF signal to a second conductive trace of the plurality of conductive traces, the second RF signal about 90 degrees out-of-phase relative to the first RF signal;

provide a third RF signal to a third conductive trace of the plurality of conductive traces, the third RF signal about 180 degrees out-of-phase relative to the first RF signal; and provide a fourth RF signal to a fourth conductive trace of the plurality of conductive traces, the fourth RF signal about 270 degrees out-of-of phase relative to the first RF signal.

4. The antenna assembly of claim 1, wherein:

the circuit board includes a first second plurality of alignment points disposed on the first surface; and each of the second plurality of alignment points being aligned with a corresponding alignment point of the first plurality of alignment points.

5. The antenna assembly of claim 4, wherein:

the structure includes a cylinder, and the first plurality of alignment points are circumferentially spaced around a perimeter of the cylinder.

6. The antenna assembly of claim 1, wherein the flexible substrate has a non-rectangular shape.

7. The antenna assembly of claim 1, wherein the flexible substrate includes a polyimide film.

8. The antenna assembly of claim 1, wherein the acute angle ranges from about 25 degrees to about 40 degrees.

9. The antenna assembly of claim 1, wherein the structure includes a polycarbonate material.

10. The antenna assembly of claim 1, wherein the helical antenna is configured to communicate over one or more frequency bands associated with satellite communications.

11. The antenna assembly of claim 10, wherein the one or more frequency bands comprise:

a first frequency band ranging from about 1980 megahertz (MHz) to about 2200 MHz; and a second frequency band ranging from about 1000 MHz to about 1800 MHz.

12. An antenna assembly comprising:

a circuit board;

a structure disposed on a first surface of the circuit board;

a flexible substrate wrapped around the structure;

a helical antenna including a plurality of conductive traces disposed on the flexible substrate; and a spacer positioned between the circuit board and a ground plane, the spacer including a projection extending through an aperture defined by the circuit board, wherein the circuit board includes a first plurality of alignment points disposed on the first surface; and the helical antenna further includes a second plurality of alignment points disposed on the flexible substrate, each of the second plurality of alignment points being aligned with a corresponding alignment point of the first plurality of alignment points.

13. The antenna assembly of claim 12, further comprising:

a phase shifter circuit disposed on a second surface of the circuit board, the phase shifter circuit configured to:

provide a first RF signal to a first conductive trace of the plurality of conductive traces;

provide a second RF signal to a second conductive trace of the plurality of conductive traces, the second RF signal about 90 degrees out-of-phase relative to the first RF signal;

provide a third RF signal to a third conductive trace of the plurality of conductive traces, the third RF signal about 180 degrees out-of-phase relative to the first RF signal; and provide a fourth RF signal to a fourth conductive trace of the plurality of conductive traces, the fourth RF signal about 270 degrees out-of-of phase relative to the first RF signal.

14. The antenna assembly of claim 12, wherein:

the structure includes a cylinder; and the first plurality of alignment points are circumferentially spaced around a perimeter of the cylinder.

15. The antenna assembly of claim 12, wherein the flexible substrate has a non-rectangular shape.

16. The antenna assembly of claim 12, wherein the flexible substrate includes a polyimide film.

17. The antenna assembly of claim 12, wherein the structure includes a polycarbonate material.

18. The antenna assembly of claim 12, wherein the helical antenna is configured to communicate over one or more frequency bands associated with satellite communications.

* * * * *